Sept. 19, 1967 H. W. CLARKE 3,343,164
LOW LEVEL ALTIMETER
Filed Sept. 10, 1965 4 Sheets-Sheet 4

INVENTOR
H. W. CLARKE

BY Fetherstonhaugh & Co.
ATTORNEYS

3,343,164
LOW LEVEL ALTIMETER
Herbert W. Clarke, Montreal, Quebec, Canada, assignor to Canadian Marconi Company, Montreal, Quebec, Canada
Filed Sept. 10, 1965, Ser. No. 486,506
Claims priority, application Canada, June 11, 1965, 933,093
2 Claims. (Cl. 343—14)

ABSTRACT OF THE DISCLOSURE

An FM/CW radar altimeter of the carrier-dispersal-compensated switched gain type for low level flying wherein the frequency of switching is greater than the highest possible Doppler shift.

---

This invention is concerned with radar-type altimeters of the frequency modulated continuous wave (FM/CW) class using the carrier-dispersal-compensated switched gain technique and is particularly directed to overcoming certain problems met by such altimeters when used in low level flying operations.

For a general discussion of carrier dispersal FM/CW altimeters reference should be made to United States patent application No. 485,023, filed Sept. 3, 1965. However, to particularly point out the nature of the problem overcome by the present invention a brief description of the carrier-dispersal-compensated switched gain type of such altimeters will be given.

In a carrier dispersal FM/CW altimeter a microwave transmitter is frequency modulated at a rate high enough to place a given sideband in a position in the spectrum removed from noise modulation products. Earth-returned echo signals are mixed in a first mixer with signals derived directly from the transmitter. An IF amplifier, tuned to the frequency of that harmonic of the modulation frequency corresponding in number to the order of the given sideband is fed from the first mixer and delivers the selected sideband signals to a second mixer. To the second mixer is also applied that harmonic of the frequency modulator signal corresponding in number to the order of the given sideband. The output from the second mixer is a demodulated echo signal having a frequency equal to the Doppler frequency shift borne by the reflected transmitter signal.

As shown in the above noted United States patent application No. 485,023, filed Sept. 3, 1965, if a further, or a secondary, frequency modulation is applied to the transmitted signal the demodulated echo signal may be considered as in itself constituting a frequency modulation signal, and as such comprises a carrier component and sideband components in conformity with the standard laws of frequency modulation. It is further shown that the demodulated echo signal then has an effective modulation index E.M.I., which may be expressed by the equation:

E.M.I.=constant × time delay × frequency deviation or $h = 78$ E.M.I./$\Delta f$ where $h$=height in feet and $\Delta f$=transmitter deviation in megacycles per second Carrier dispersal FM/CW altimeters make use of the above relationship by adjusting the deviation $\Delta f$ applied by the secondary frequency modulation to that value where, by dispersing the energy in the carrier component of the demodulated echo signal into sidebands, said carrier component amplitude is reduced to a predetermined fraction of its unmodulated value, this fraction then representing a given value of the effective modulation index E.M.I.

In the carrier-dispersal-compensated switched gain type of altimeter, with which the present invention is concerned, the gain in the echo signal path is alternately switched between two values and simultaneously the secondary frequency modulation is switched on and off—on the low gain position, no applied modulation; on the high gain position, modulation applied. The demodulated echo signal output of the second detector is fed to a low pass filter which excludes the higher order secondary frequency modulation sidebands, permitting only the carrier component to pass. The amplitudes of this demodulated echo signal carrier on the two different switching positions are compared, and any difference compensated for by adjusting the deviation applied by the secondary frequency modulation. Normally this comparison and adjustment is done automatically by an amplitude comparing circuit acting as the controlling element in a servo loop system. Control of deviation may be directly effected by varying the amplitude of the applied secondary modulation signal in the usual case where the transmitter is comprised of a klystron having linear frequency deviation characteristics. Height may then be directly indicated by an amplitude measuring meter calibrated in terms of height.

When the above described type of altimeter is used in an aircraft operating at low levels over rough terrain or choppy seas it is found that the demodulated echo signal carrier component provided by the second mixer, is comprised of a violently fluctuating spectrum of signals. In prior art altimeters, in order to effect amplitude comparison between the two switched signals they must be stored or smoothed, and it is found in practice in the operation of such prior altimeters of this type that the necessary storage or smoothing time involved results in unacceptably sluggish response.

It is therefore an aim of the present invention to provide means whereby the speed of response of carrier-dispersal-compensated switched gain FM/CW altimeters for use at low levels may be greatly improved.

An appreciation of certain characteristics of the demodulated echo signal carrier component with which such altimeters must deal can be obtained when it is realized that, for low level operation over rough terrain, echoes are returned from a constantly changing complex of individual reflecting surfaces encompassed within the bounds of the aerial beam configuration, echoes of far from negligible amplitude possibly being obtained from points far displaced laterally from that point which is directly below the altimeter. There is, however, one characteristic of this signal spectrum that can be definitely determined, namely, its maximum possible frequency. This frequency, of course, is that due to the Doppler shift corresponding to the maximum speed of the altimeter-bearing aircraft relative to the earth taken in conjunction with the aerial beam pattern, and can thus be readily calculated for any given altimeter installation.

The present invention takes cognizance of the above noted frequency characteristic of the demodulated echo signal and utilizes it in conjunction with the concept that the compensating of switched or alternating gain by adjusting carrier dispersal may be considered as the action of reducing a process of amplitude modulation to a nullity. According to the invention the gain switching operation is performed at a rate such that the amplitude modulation sideband products resultant therefrom as borne by the demodulated echo signal carrier component are placed in the spectrum above the highest Doppler frequency carrier echo component, the said amplitude modulation components are selected by filter means, and the deviation applied to the transmitter signal by the secondary frequency modulation is so adjusted as to reduce the said amplitude modulation components to a minimum.

The invention will be further explained and discussed with reference to the accompanying drawings in which.

Figure 1:
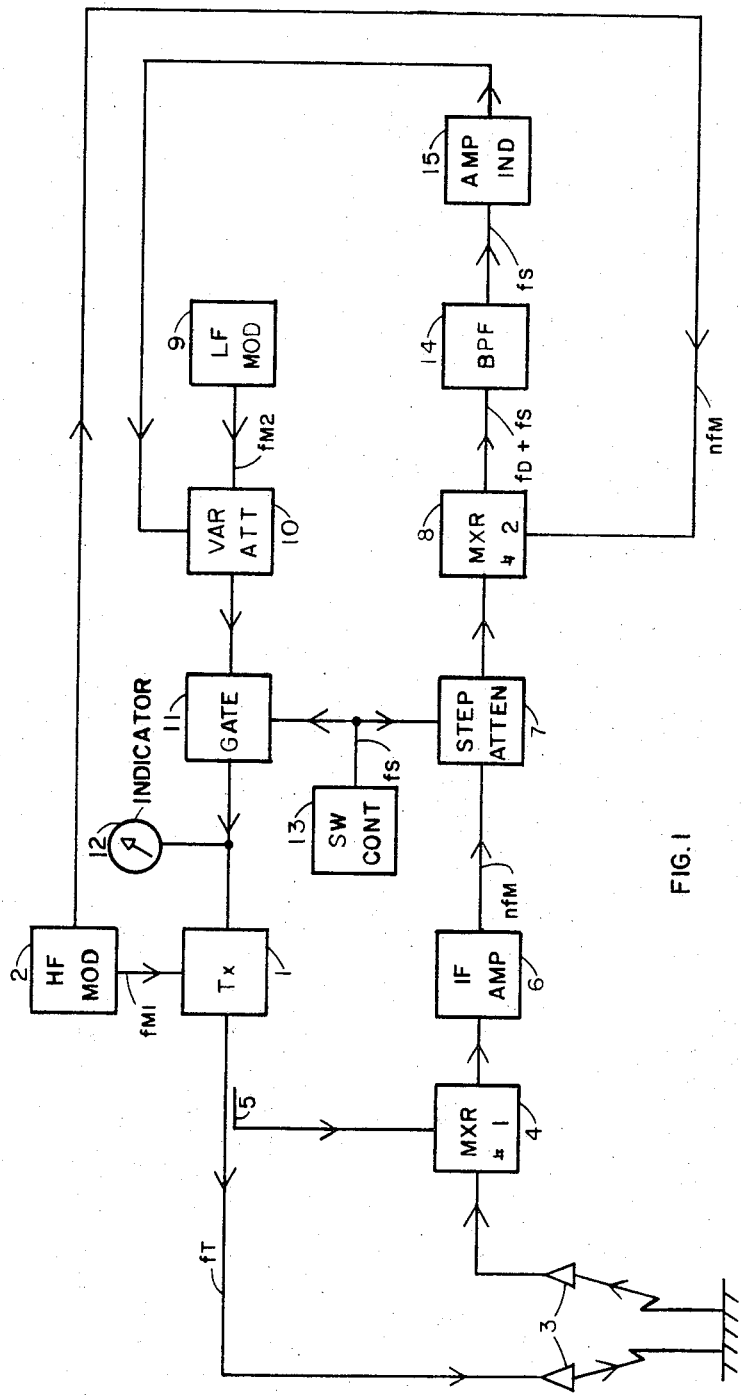
FIGURE 1 shows in block form an arrangement of circuit elements in accordance with the invention.

Referring to FIGURE 1 a microwave transmitter 1, frequency modulated by a high frequency modulator 2 operating at frequency $fm_1$ supplies a frequency modulated signal of carrier frequency $fT$ to the aerial system 3 which sends this signal to the earth's surface and picks up the returned echo signal and applies it to the first mixer 4. The first mixer 4 is also supplied with energy from the transmitter by a coupler or like device 5, and of the spectrum of mixer products produced by mixer 4 and IF amplifier 6 selects those corresponding to a frequency modulation sideband of predetermined order. As illustrated here the "$n$th" order sideband is used whereby IF amplifier 6 is tuned to the frequency $n\ f_{M_1}$ of the high frequency modulator 2. The thus selected echo signal is fed through a two position step attenuator 7 to a second mixer 8 where it is mixed with a harmonic of the high frequency modulator corresponding to the order of the sideband selected by IF amplifier 6 and which in this case, therefore, is $n\ f_{M_1}$.

The demodulated echo signal at the output of mixer 8 will be a wave of frequency equal to the Doppler frequency shift $f_D$ borne by the earth-returned echoes by virtue of the relative radial motion of the altimeter with respect to the signal reflecting surfaces on the earth, and in accordance with altimeters of the type to which the present invention applies, is considered to of itself constitute a carrier wave signal responsive to frequency modulation at the transmitter in accordance with known laws of frequency modulation.

A low frequency modulator 9, operating at a predetermined frequency $f_{M_2}$, applies a secondary frequency modulating signal periodically to transmitter 1 through means whereby it effects an adjustable known frequency deviation thereof. As illustrated, these means may comprise a variable attenuator 10, an on-off gate 11, and a signal level indicator 12. A switching control, 13, operating at a frequency $f_S$, provides control signals which on one half cycle opens gate 11 and sets step attenuator 7 at minimum, and on the other half cycle closes gate 11 and sets step attenuator 7 to insert a predetermined added attenuation in the echo signal path.

The output from the second mixer 8 is applied to a filter 14 tuned to accept only the signals grouped around the switching frequency $f_S$, and the output from filter 14 applied to an amplitude indicator 15. The response from the indicator 15 is used as control for the variable attenuator 10, adjusting 10 until the output of filter 14 is a minimum. In its simplest form the adjustment of attenuator 10 could be accomplished by a human operator observing the response of indicator 15, but in practice, of course, a servo control of appropriate design would be used.

Figure 2:
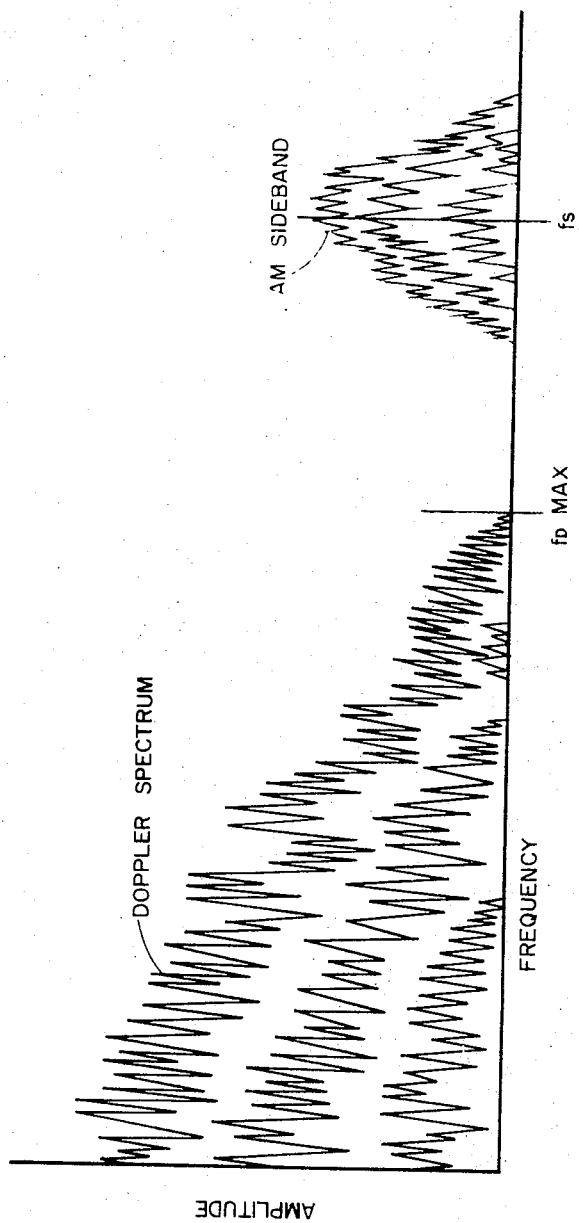
FIGURE 2 shows the type of signals present at one point in an altimeter in accordance with the invention.

FIGURE 2 illustrates the nature of the demodulated echo signals available from the second mixer 8 of the invention shown in FIGURE 1. As will be seen fluctuating echo signals may be expected anywhere in the spectrum up to, but not beyond, a determinable frequency $f_{D_{max}}$, the maximum possible Doppler frequency shift. The switching frequency $f_S$ is selected to be above $f_{D_{max}}$ and at this point will lie the quasi amplitude modulation sideband component resulting from the switching process. This sideband component will not be a single frequency, of course, and will be comprised of fluctuating components. However, in accordance with the invention no measurement, strictly speaking, is made of the sideband amplitude as such—its presence or its absence is determined, nothing more.

Figure 3:
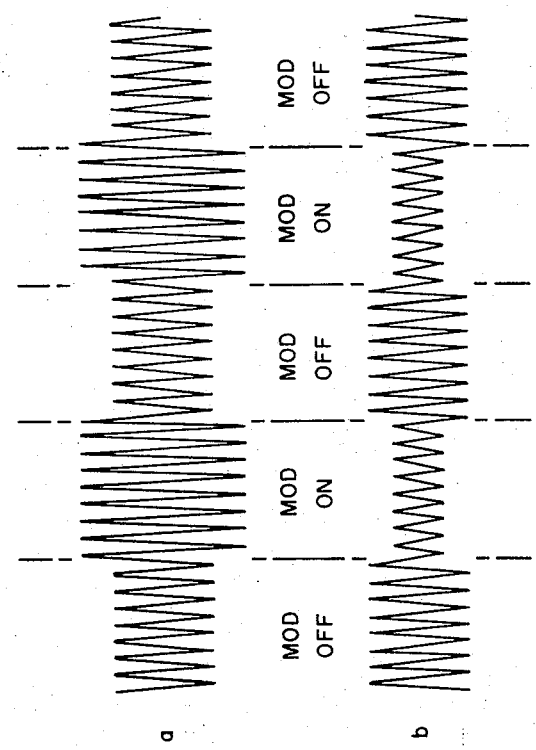
FIGURE 3 is an explanatory graphical figure.

While the amplitude null detecting system for use in the invention, as indicated in FIGURE 1, may be any suitable, preferably servo-control system, available and known to those skilled in the art, in accordance with a further feature of the invention it is preferred to make use of another phenomenon involved in the particular form of amplitude modulation, or quasi amplitude modulation, effected by the operation of the invention. Referring to FIGURE 3 there are shown two aspects of the demodulated echo signal at the output of the second mixer. In FIGURE 3a is shown the case when insufficient deviation is applied by the secondary frequency modulator, and in FIGURE 3b the case when the deviation is too great. Evidently in 3a the modulating signal adds, and in 3b subtracts, in respect to the desired or nonmodulated signal. It follows, therefore, that the modulation on the signal must reverse in phase when it passes from the two great to the too little condition, and it is found in fact that this phase reversal occurs with the demodulated echo signal amplitude modulation sideband.

Figure 4:
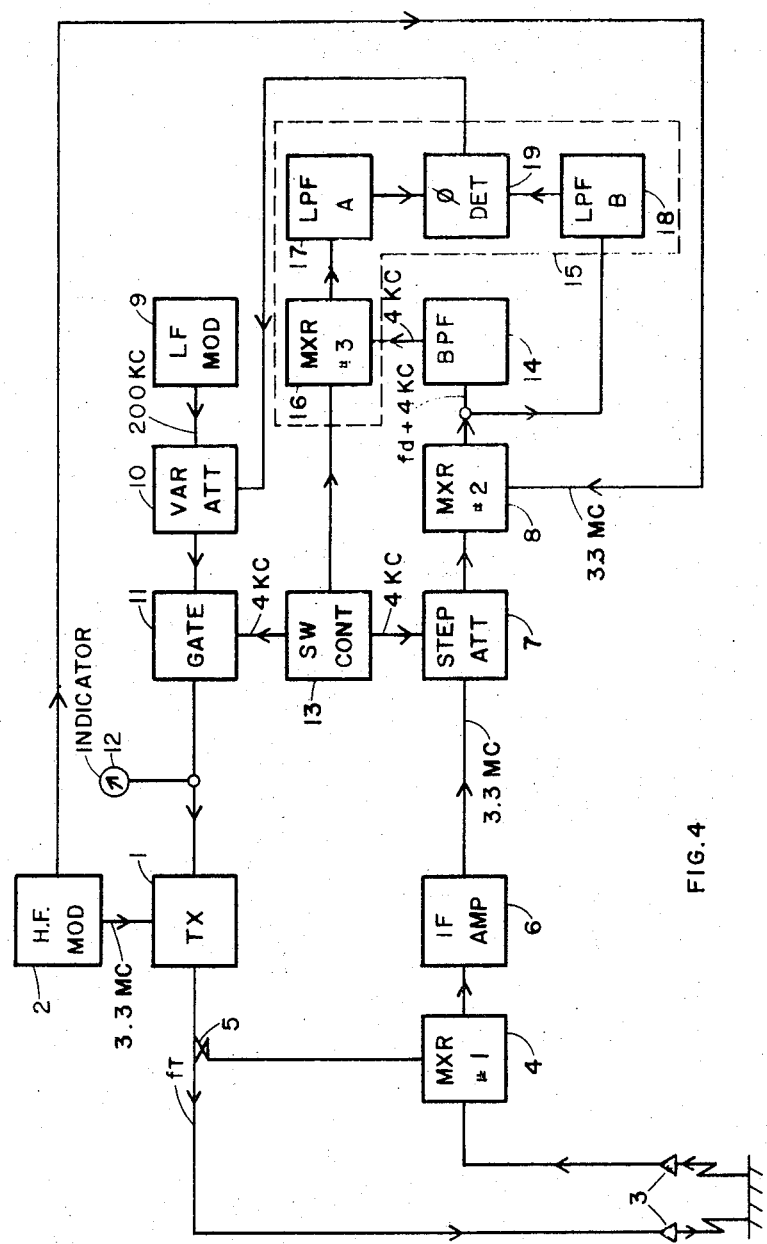
FIGURE 4 shows a preferred embodiment of the invention.

FIGURE 4 shows a preferred embodiment of the invention which makes use of this phase reversal phenomenon. The elements of FIGURE 4, and the operation thereof, up to the output of mixer 8 are the same as has been discussed with reference to the embodiment of the invention shown in FIGURE 1. As such they need not be discussed again except to point out that, in FIGURE 4, some representative operating frequencies have been shown, and it may be noted that the first order sideband of the primary frequency modulation is used. It is to be understood that the frequencies shown are illustrative of the values found suitable for a given set of operating flight conditions and are in no way intended to be limiting.

As shown in FIGURE 4, the amplitude modulation sideband at the output of bandpass filter 14, tuned to the switching control frequency $f_S$ of 4 kilocycles per second, is applied to a third mixer 16 where it is synchronously demodulated. A relatively narrow, low frequency portion of the recovered quasi amplitude modulation sideband is selected by a lowpass filter 17. A second lowpass filter 18, having the same characteristics as filter 17 meanwhile selects a corresponding portion of the quasi amplitude modulation carrier component of the demodulated echo signal. The outputs from filters 17 and 18 are applied to phase detector 19 which provides an output indicative of the relative phases of the sideband and carrier signals. The output of phase detector 19 then is used to control the setting of variable attenuator 10, applying adjustment in opposite directions dependant upon the relative detected phase relationship.

It has been found in practice that the responsiveness of an altimeter in accordance with the invention can be so increased over prior art carrier dispersion altimeters that the signal level difference effected by the step attenuator can be reduced considerably over that previously required, or in other words the secondary frequency modulation need not disperse as much carrier energy into sidebands. This eases the requirements on the secondary frequency modulation system and maintains a higher level of signals in the system.

As will be evident to those skilled in the art the foregoing discussion has been aimed at setting forth the inventive concepts peculiar to the present invention. A discussion of the many factors of design, operation, and selection of operating parameters involved in FM/CW navigational sensors and carrier dispersal type FM/CW altimeters, and which are basic to the carrier-dispersal-compensated switched gain FM/CW altimeter to which the present invention applies has, of necessity, been omitted here. Information on this background material may be obtained by reference to Canadian Patent No. 589,882, K. C. M. Glegg, and to United States patent application No. 485,023, K. C. M. Glegg, filed Sept. 3, 1965.

I claim:

1. A carrier-dispersal-compensated switched gain FM/CW altimeter of the type herein described adapted for use upon a low-flying aircraft, said altimeter having a transmitter, continuously operating means applying primary frequency modulation to said transmitter, periodically operative means to apply secondary frequency modulation to said transmitter, an aerial system adapted to direct transmitter signals to the earth's surface and to receive echo signals returned therefrom, receiving means fed from said aerial and adapted to produce demodulated echo signals of frequency corresponding to the Doppler frequency shift borne by the earth-returned echo signals, switchable gain control means in the echo signal path synchronously operative with said means to apply secondary frequency modulation to said transmitter and adapted to switch the gain in said echo signal path from a given higher level when said secondary frequency modulation is applied to said transmitter to a given lower level when said secondary frequency modulation is not applied to said transmitter, adjustable means to control the frequency deviation of said transmitter effected by said secondary frequency modulation, and means to indicate the value of said effected secondary frequency deviation, said altimeter in operation without secondary frequency modulation being subject to the production of demodulated echo signals comprising a fluctuating spectrum extending in frequency to a predeterminable maximum frequency dependent upon the maximum operating speed of said aircraft taken in conjunction with the beam configuration of said altimeter aerial, said altimeter being characterised by the provision of: a source of switch controlling signals simultaneously operative upon said means periodically operative to apply secondary frequency modulation and upon said switchable gain control means and having a given switching frequency in excess of said maximum predeterminable frequency of the spectrum of derived echo signals, filter means fed with said demodulated echo signals and responsive to signals grouped about said switching frequency to the exclusion of signals in said fluctuating spectrum of demodulated echo signals, amplitude responsive means fed with the output of said filter means, and means to apply the output of said amplitude responsive means to so adjust said control of secondary frequency deviation as to reduce the input to said amplitude responsive means to a minimum.

2. A carrier-dispersal-compensated switched gain FM/CW altimeter as claimed in claim 1 wherein said amplitude responsive means comprises a mixer fed with the output of said filter means, means to also apply to said mixer said switching control signals, first and second narrow band low frequency filters having substantially the same frequency response, a phase detector, means to feed one input of said phase detector from said mixer through the first of said narrow band low frequency filters, means to feed the other input of said phase detector through said second narrow band low frequency filter from the same source of signals from which is fed that filter supplying said mixer, and means to utilize the response of said phase detector to adjust said control of secondary deviation.

References Cited

UNITED STATES PATENTS 3,197,773    7/1965    Black et al. _____ 343—14 X

RODNEY D. BENNETT, *Primary Examiner.*

C. L. WHITHAM, *Assistant Examiner.*